July 20, 1965 W. J. LAMNECK 3,196,401

DATA IDENTITY GENERATOR

Filed March 25, 1960 2 Sheets-Sheet 1

INVENTOR
W. J. LAMNECK
BY S. E. Hollander
ATTORNEY

FIG. 3

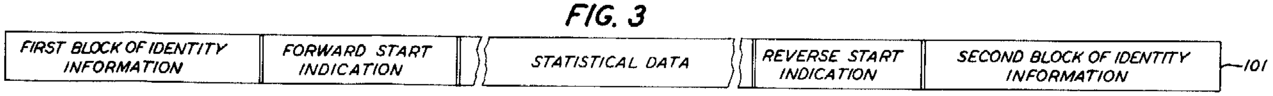

TABLE I

EQUIVALENT BINARY CODED NOTATIONS

| DECIMAL NUMBER | DECIMAL DIGIT | T0 | T1 | T2 | T3 | T4 | T5 | T6 | T7 | T8 | T9 | T10 | INPUT LEAD |
|---|---|---|---|---|---|---|---|---|---|---|---|---|---|
| (602) | FORWARD START | 1 | 1 | 1 | 0 | 1 | 1 | 1 | 0 | 1 | 1 | 1 | 39 |
| (850) | REVERSE START | 1 | 1 | 0 | 1 | 1 | 1 | 1 | 1 | 0 | 1 | 1 | 40 |
| (62) | 0 | 1 | 0 | 0 | 0 | 0 | 1 | 0 | 0 | 0 | 0 | 1 | 29 |
| (95) | 1 | 0 | 0 | 0 | 0 | 1 | 1 | 1 | 0 | 0 | 0 | 0 | 30 |
| (207) | 2 | 0 | 0 | 0 | 1 | 0 | 1 | 0 | 1 | 0 | 0 | 0 | 31 |
| (174) | 3 | 1 | 0 | 0 | 1 | 1 | 1 | 1 | 1 | 0 | 0 | 1 | 32 |
| (455) | 4 | 0 | 0 | 1 | 0 | 0 | 1 | 0 | 0 | 1 | 0 | 0 | 33 |
| (422) | 5 | 1 | 0 | 1 | 0 | 1 | 1 | 1 | 0 | 1 | 0 | 1 | 34 |
| (310) | 6 | 1 | 0 | 1 | 1 | 0 | 1 | 0 | 1 | 1 | 0 | 1 | 35 |
| (343) | 7 | 0 | 0 | 1 | 1 | 1 | 1 | 1 | 1 | 1 | 0 | 0 | 36 |
| (963) | 8 | 0 | 1 | 0 | 0 | 0 | 1 | 0 | 0 | 0 | 1 | 0 | 37 |
| (930) | 9 | 1 | 1 | 0 | 0 | 1 | 1 | 1 | 0 | 0 | 1 | 1 | 38 |

FIRST INFORMATION SECTION (T0–T4) SECOND INFORMATION SECTION (T6–T10)

TABLE II

| TERMINALS OF ARC B | | IDENTITY OF INFORMATION SLOT | CONTROL LEAD |
|---|---|---|---|
| 1 | 28 | APPARATUS TENS | 42 |
| 2 | 27 | APPARATUS UNITS | 43 |
| 3 | 26 | YEARS TENS | 44 |
| 4 | 25 | YEARS UNITS | 45 |
| 5 | 24 | MONTH TENS | 46 |
| 6 | 23 | MONTH UNITS | 47 |
| 7 | 22 | DAYS TENS | 48 |
| 8 | 21 | DAYS UNITS | 49 |
| 9 | 20 | HOURS TENS | 50 |
| 10 | 19 | HOURS UNITS | 51 |
| 11 | 18 | OFFICE TENS | 52 |
| 12 | 17 | OFFICE UNITS | 53 |
| 13 | 16 | SPARE | 54 |
| 14 | | START (FORWARD) | 55 |
| | 15 | START (REVERSE) | 56 |

FIG. 2

INVENTOR
W. J. LAMNECK
BY S.E. Hollander
ATTORNEY 3,196,401
Patented July 20, 1965

3,196,401

DATA IDENTITY GENERATOR

William J. Lamneck, Jamaica, N.Y., assignor to Bell Telephone Laboratories, Incorporated, New York, N.Y., a corporation of New York Filed Mar. 25, 1960, Ser. No. 17,648
14 Claims. (Cl. 340—172.5)

This invention relates to data identity generators and more particularly to data identity generators to be employed in conjunction with traffic measurement apparatus for particularly identifying accumulated statistical data for purposes of telephone traffic studies.

Generally, statistical data for purposes of telephone traffic studies is initially accumulated in a form which is identifiable on an immediate basis as relevant to a plurality of units of equipment to be studied. For example, such data normally appears as electrically indistinguishable pulse indications along control leads which are peculiarly identified with either an individual one or a group of selected ones of a plurality of units of equipment. However, as each of the pulse indications so directed has a finite duration, it becomes evident that the information represented thereby is lost and not available for traffic studies unless such indications are either immediately processed or recorded for a later processing by automatic data processing machines.

Heretofore, certain prior art practice has been to connect a mechanical counter device or other equally cumbersome device to a control lead emanating from a traffic monitoring circuit individually associated with each individual one or a group of selected ones of the plurality of units of equipment to be studied. Such devices are, thereupon, operative to count and record the individual pulse indications directed thereto along the particular control lead. The shortcomings in this manner of accumulating data are obvious as considerable time and effort is expended by human agents in compiling, interpreting, and indexing the statistical data. The effort required to perform such operations necessarily limits the amount of statistical data which can be accumulated. Further, the need of employing human agents for such operations not only increases the cost of the individual traffic study but also provides a major source of error therein.

Priorly, an indexing of statistical data involved the translation thereof by human agents to a notational form peculiarly designating the origin thereof, i.e., the identity of the unit of equipment being monitored, which could thereafter be processed by automatic data processing machines. To avoid such shortcomings, present day traffic monitoring apparatus have been adapted to directly provide statistical data in a notational form peculiarly designating the origin for immediate recording on a storage medium without the intervention of human agents. A traffic monitoring apparatus of this type is, for example, described in the D. H. Barnes patent application, Serial No. 1,602, filed on January 11, 1960, now Patent No. 3,099,819. The desirability of recording statistical data on a storage medium for later processing by automatic data processing equipment is predicated upon the excessive cost and, also, the nonfeasibility of providing one such equipment for each traffic monitoring apparatus located at each individual accumulating station. The recording of accumulated statistical data on a storage medium is particularly advantageous since it provides that such data may be later processed at a convenient time and at a centralized location by an automatic data processing equipment shared by a plurality of accumulating stations.

However, while each bit of statistical data is identifiable with respect to origin, the statistical data as recorded on the storage medium must also be properly identified with respect to the accumulating station and, also, numerous traffic-affecting variables, e.g., time of day, particular day of the week, month, etc., hereinafter referred to as identity information. The importance of accurately recorded identity information can be realized if one considers that traffic surveys provide a continuous survey for the determination of present and future traffic trends to be supported by particular units of equipment. In the event that identity information is improperly recorded, the statistical data is rendered unidentifiable and, therefore, valueless for purposes of traffic studies. It is evident, therefore, that the relative importance of identity information is equal to or exceeds that of statistical data as recorded on the storage medium.

Identity information has been generally recorded either preceding or subsequent to the statistical data on the storage medium. However, statistical data so recorded and identified is often subjected to multiple processings. In prior art practice, it is necessary to renormalize the storage medium, e.g., a rewinding of a magnetic tape storage medium, prior to each successive processing thereof to direct identity information and the statistical data to the automatic data processing equipment in a proper sequence. It is evident that such requirement necessarily imposes a limitation upon the efficiency of the automatic data processing equipment as well as an expenditure of both time and energy on the part of human agents thereby further increasing the cost of each individual traffic study.

An object of this invention is to provide for the identification of statistical data recorded on a storage medium whereby a bidirectional processing of such data may be effected by automatic data processing equipment without the necessity of renormalizing such medium.

Another object of this invention is to provide a data identity generator which may be effectively incorporated as an integral part of a traffic measurement apparatus employed for accumulating statistical data.

A further object of this invention is to provide a data identity generator which is simple and economical in construction and yet reliable in operation to provide identity information for statistical data recorded on a storage medium.

A still further object of this invention is to provide for the recordation of identity information in reverse sequences prior to and subsequent to the recordation of statistical data on a storage medium, such identity information being in such form as to be immediately processable by automatic data processing equipment on a bidirectional basis.

An additional object of this invention is to minimize the probability that statistical data recorded on a storage medium be rendered unidentifiable.

These and other objects of this invention are achieved by the provision of a data identity generator which is operative prior to and subsequent to each operation of the traffic monitoring apparatus in accumulating the statistical data to be identified to generate in reverse sequences predetermined bits of identity information each in the form of equivalent binary coded notations having an inherent symmetry of binary digits. Thus, a typical pattern of binary digits comprising an equivalent coded notation may read 10000100001. The series of bits of identity information thus generated are recorded as mirrored images on a storage medium to bracket the statistical data also recorded thereon. A proper series of identical bits of identity information both preceding and succeeding the recorded statistical data is, therefore, presentable on a bidirectional basis to automatic data processing equipment. Accordingly, a desired sequence of recorded statistical data and one of the series of bits of identity information relevant thereto is presented regardless of the direction of processing of the storage medium. Therefore, the necessity of renormalizing the storage medium for multiple processings thereof is avoided. Further, as the bits of identity information bracketing the recorded statistical data are mirrored images, that series of bits of identity information appearing in proper sequence with the recorded statistical data is immediately processable as presented; consequently, that portion of the automatic data processing equipment utilized for processing the series of bits of identity information can be simplified accordingly.

To minimize the probability that the statistical data as recorded on the storage medium is rendered unidentifiable, each equivalent binary coded notation provides a redundancy of the identity information peculiarly designated thereby, i.e., each equivalent binary coded notation comprises a pair of information sections, each section being definitive per se of the identity information. Thus, in the illustrative pattern set forth above, the first information section advantageously comprises the first five binary digits 10000 and the second information section advantageously comprises the last five binary digits 00001. As each equivalent binary coded notation has an inherent symmetry of binary digits, the information sections contained therein are mirrored images. In addition, each equivalent binary coded notation is provided parity which is so reflected that parity is also provided to each of the information sections contained therein, e.g., an odd number of binary "1's" are provided to each. Accordingly, each equivalent binary coded notation can be subjected to a three-way parity check, i.e., a parity check of each of the information sections and, also, of the over-all parity of the equivalent binary coded notation. It is evident, therefore, that an improper recordation of a binary digit is reflected in the over-all parity as well as the parity of that information section of the equivalent binary coded notation in which it appears. In such case, proper identity information is immediately available to the automatic data processing equipment on a single-error correcting basis from that information section of the equivalent binary coded notation determined as having proper parity.

To insure a proper bracketing of the statistical data by the identity information on the storage medium, the traffic monitoring apparatus is adapted to be operated intermediate the operations of the data identity generator. Upon a commencement of a recording sequence, the data identity generator is initially operative to provide series of bits of identity information to be recorded preceding the statistical data to be identified. Upon such identity information having been provided, the data identity generator is operative to initiate the operation of the traffic monitoring apparatus to accumulate statistical data relevant to the units of equipment being monitored. A completed operation of the traffic monitoring apparatus reinitiates the operation of the data identity generator to provide a reverse series of the same bits of identity information to be recorded succeeding the recorded statistical data. The interdependent operation of the traffic monitoring apparatus and the generator apparatus positively avoids the danger of mutilation of either the statistical data or the identity information.

To distinguish the recorded identity information and the statistical data, the latter not being designated by equivalent binary coded notations having inherent symmetry, the data identity generator is operative to provide bits of information recognizable by the automatic data processing equipment as start indications designating the required mode or direction of processing of the statistical data. Start indications are advantageously provided to immediately bracket the statistical data as recorded on the storage medium.

In summary, a typical recordation pattern on the storage medium would include a first block of identity information followed in turn by a start indication, the recorded statistical data, a second start indication and a second block of identity information which is a mirrored image of the first block of identity information.

A feature of this invention relates to the provision of a data identity generator which is operative to provide a series of bits of identity information with respect to a plurality of units of equipment in a reverse sequence prior to and subsequent to the accumulation of statistical data relevant to such units by traffic monitoring apparatus.

Another feature of this invention relates to the provision of a data identity generator which is operative to provide identity information in the form of equivalent binary coded notations having an inherent symmetry of binary digits.

Still another feature of this invention relates to the provision of control apparatus to effect an accumulation of statistical data to be identified intermediate the sequences of operations of the data identity generator to provide identity information with respect to such data.

Additional objects and features of this invention will become apparent from a consideration of a detailed description hereinafter set forth in conjunction with the accompanying figures wherein FIG. 1 is an illustrative embodiment of a data identity generator in accordance with the principles of this invention; Tables I and II of FIG. 2 set forth identity designations of the information slots and code tables, respectively, to facilitate an understanding of the operation thereof; and FIG. 3 illustrates a typical recordation pattern of statistical data and identity information relevant thereto on the storage medium.

*General description*

Referring to FIG. 1, the data identity generator therein illustrated is operative according to the principles of this invention to provide identity information in the form of equivalent binary coded notations to particularly identify statistical data accumulated by the traffic monitoring apparatus 100 to be subsequently recorded on a magnetic tape storage medium 101 included in the serial reader-recorder 110. Such data identity generator is hereinafter described as incorporated into a traffic measuring apparatus substantially of the type described in the above-identified D. H. Barnes patent application. The constituent parts of the traffic measuring apparatus of the D. H. Barnes patent application, save for the encoder 102, are illustrated in FIG. 1 in block form to simplify and particularly direct the following description. However, it is to be understood that the principles of this invention may be advantageously employed wherever identity or like information is to be provided on a storage medium.

*Determination of information slots in blocks of identity information to be provided*

The data identity generator comprises a pulse generator control apparatus 104 including a switch bank having three arcs of contacts designated as arc A, arc B and arc C and appropriate control apparatus, hereinafter described, for providing a self-stepping operation thereto and also, a pulse generator to be controlled thereby. The pulse generator is operative to selectively direct identity information in the form of electrically indistinguishable pulse indications along the input leads 29 through 40 of the encoder 102. Each of the arcs A, B and C is provided with a semicircular configuration of contacts 1 through 28 along which a wiper arm is adapted to be successively advanced during the self-stepping operation of the switch bank. The wiper arms of each of the arcs A, B and C are normally positioned on the respective contacts 1 and adapted to be stepped simultaneously.

As is hereinafter described in detail, the pulse generator control apparatus 104 effects the generation of a block of identity information prior to and subsequent to the operation of the traffic monitoring apparatus 100; corresponding information slots are reflectedly disposed in the blocks of identity information and particularly designated according to the item of identity information or start indication to be provided therein as shown in Table II of FIG. 2. The information slots in the blocks of identity information so provided correspond to the contacts 1 through 14 and 15 through 28, respectively, of arc B. Reflected pairs of the contacts of arc B, i.e., contacts 1 and 28 through 13 and 16, are multipled to the control leads 42 through 54, respectively; the contacts 14 and 15 are connected to the start relays 70 and 71, respectively, along the control leads 55 and 56, respectively. Accordingly, the control leads 42 through 54 (only 42, 43, 51 and 54 being designated to preserve clarity) correspond one to each of the corresponding reflectedly disposed information slots in the blocks of identity information and are energized in a forward sequence and in a reverse sequence upon the wiper arm of arc B having advanced along successive ones of the contacts 1 through 13 and 16 through 28, respectively; also, the control leads 55 and 56 are energized intermediate such sequences upon the wiper arm having advanced along the contacts 14 and 15, respectively.

*Generation of items of identity information*

The particular item of identity information to be included in corresponding reflectedly disposed information slots of the blocks of identity information is determined by the pattern of cross-connections directed to the control leads 42 through 54 as explained further herein. Such pattern of cross-connections is determinative of the sequences in which the relays 60 through 69 are energized; also, forward and reverse start indications are provided on the energization of the relays 70 and 71, respectively. Relays 60 through 71 are selectively operated in the determined sequences to connect the pulse generator network 106 to the input leads 29 through 40, respectively, of the encoder 102 through the contacts 60 through 71, respectively. The input leads 29 through 38 are particularly identified with decimal digits 0 through 9, respectively, while the input leads 39 and 40 are particularly identified with a forward and a reverse start indication, respectively.

Accordingly, upon an energization of each of the control leads 42 through 56 and the resulting operation of the particular one of the relays 60 through 71 connected thereto, the pulse generator network 106 is operative to direct a pulse indication along a predetermined one of the input leads 29 through 40 of the encoder 102 in that information slot corresponding to the particular one of the contacts 1 through 28 of arc B to which the wiper arm has advanced. The encoder 102 is thereupon operative to encode each pulse indication so received to an equivalent binary coded notation having inherent symmetry. Each of the equivalent binary coded notations is directed from the encoder 102 to subsequent information transfer circuits which include the buffer storage unit 108 and the serial reader-recorder 110 for recording on the magnetic tape storage medium 101 included within the latter. The identity information with respect to the recorded statistical data is, accordingly, represented on a digit basis. By digit basis is meant the "tens" digit and also the "units" digit of a decimal number are individually encoded and recorded in distinct and peculiarly designated information slots.

*Accumulation of statistical data*

Upon the first block of identity information having been provided, i.e., the control leads 42 through 55 have been energized in a first directional sequence by the advancement of the wiper arm along successive ones of the contacts 1 through 14 of arc B, the pulse generator control apparatus 104 is inhibited and the traffic monitoring apparatus 100 is enabled through the agency of arc A of the switch bank. The traffic monitoring apparatus 100 is now operative to accumulate statistical data relevant to the units of equipment S0 through S599, e.g., the busy or idle condition thereof. As described in the above-identified D. H. Barnes patent application and, more particularly, in the W. J. Lamneck et al. patent application, Serial No. 1,604, filed on January 11, 1960, now Patent No. 3,115,549, which is referred to therein, the traffic monitoring apparatus 100 is operative to successively direct electrically indistinguishable pulse indications upon the determination of a predetermined traffic condition at the units of equipment S0 through S599 along the input leads L0 through L599, respectively; the input leads L0 through L599 are arranged in cable 73. As in the case of pulse indications representing identity information, each pulse indication directed along one of the input leads L0 through L599 is recognized as an item of statistical data relevant to a particular one of the units of equipment S0 through S599, respectively, and encoded to an equivalent binary coded notation thereof. The statistical data in the form of equivalent binary code notations is thereupon directed from the encoder 102 to the buffer storage unit 108 and recorded subsequent to the first block of identity information on magnetic tape storage medium 101 included in the serial reader-recorder 110.

*Generation of second block of identity information*

Upon a desired amount of statistical data having been accumulated, the traffic monitoring apparatus 100 is inhibited and the pulse generator control apparatus 104 is against operated through the agency of the duration control apparatus 142. The wiper arm of arc B is now stepped along successive ones of the remaining contacts 15 through 28 of arc B. Accordingly, the control leads 56 and 54 through 42 are energized in turn whereby the pulse generator network 106 is connected to the input lead 40 through the contact 71 to first provide a reverse start indication and, then, to selected ones of the input leads 29 through 38 through the contacts 60 through 69, respectively, to provide the second block of identity information. The pulse indications so directed along selected ones of the input leads 29 through 38 are in a sequence reversed with respect to that provided prior to the recordation of the statistical data. Again, the encoder 102 is operative to encode each pulse indication now directed thereto; the equivalent binary coded notations so provided are recorded as the block of identity information subsequent to the statistical data on the magnetic tape storage medium 101 included in the serial reader-recorder 110. The statistical data accumulated by the traffic monitoring apparatus 100 is, therefore, bracketed and identified on the magnetic tape storage medium 101 of the serial reader-recorder 110 by mirrored images of identity information immediately processable on a bidirectional basis by automatic data processing equipment; further such statistical data is immediately bracketed by start indications which define the required mode of processing of the statistical data.

*Provision of start indications*

The arrangements of binary digits contained in each of the equivalent binary coded notations, inclusive of parity bit, are identical so that a same series of bits of identity information is presented in proper sequence with the recorded statistical data regardless of direction of processing thereof. However, as the bidirectional presentations of the recorded statistical data are not identical, start indications in the form of equivalent binary coded notations having inherent symmetry are provided immediately thereto and subsequent thereto on the magnetic tape storage medium 101. The equivalent binary coded notations designated in Table I of FIG. 2 as start indications are detectable as such while indicating the particular direction in which the statistical data recorded on the magnetic tape is to be processed. For example, the equivalent binary coded notations of the decimal numbers 602 and 850, as suggested in Table I of FIG. 2, may be each employed as start indications while individually indicating a forward and reverse directional processing, respectively, of the magnetic tape storage medium 101. As such indications are provided immediately bracketing the recorded statistical data, the initial appearance of one of such indications signifies the commencement of recorded statistical data to be processed and in addition, indicates the mode of serial-to-parallel conversion to be effected by the automatic data processing equipment. The commencement of identity information with respect to such statistical data is, thereupon, indicated by the appearance of the other start indication. Such sequence of processing of the statistical data and the identity information is suggested to allow the necessary magnetic tape transport mechanisms to attain a steady operating condition prior to the initial appearance of the statistical data.

The recordation pattern on the magnetic tape storage medium 101 is illustrated in FIG. 3. It is noted that the statistical data as recorded on the magnetic tape storage medium 101 is immediately bracketed by a forward and a reverse start indication which (1) designate the direction in which such data is to be processed and (2) distinguish such data from the first and second blocks of identity information, respectively. The first and second blocks of identity information inclose the forward and reverse start indications to provide that the statistical data is further bracketed by mirrored images of identity information. It is evident, therefore, that a block of identity information comprising proper series of bits of identity information appears in proper sequence with the statistical data regardless of the direction in which the magnetic tape storage medium 101 is processed.

*Parity considerations*

As hereinafter described, the input leads 29 through 40 are each selectively threaded through the transformer cores 75 and 76 to provide, inclusive of parity bit, for the encoding of an equivalent binary coded notation suitable for recording on a single-error correcting basis. As illustrated in Table I of FIG. 2 along with the decimal number equivalents thereof, each reflected binary coded notation is an eleven-bit binary word, inclusive of parity bit, comprising an odd number of binary "1's" and having inherent symmetry, i.e., the sequence of binary bits therein is bidirectionally identical. The binary digits on either side of the center bit slot, i.e., slot T5, of each equivalent binary coded notation are mirrored images to provide separate information sections. The information are each definitive of the identity information, i.e., the decimal digit or start indication, to provide a redundancy of such information in each information slot. In each information section, however, the identity information is presented in a straight binary code rather than in a reflected binary code as is presented the equivalent coded notation which they comprise. The bit slots of the first and second information sections are determined to be of increasing order magnitudes outwardly from the center bit slot T5. In addition, parity is reflected to each of the information sections by the over-all parity of the equivalent binary coded notation. The bit slots furthest removed from the center bit slot, i.e., slots T0 and T10, provide parity to the respective information sections. As the bit slot T5 can be disregarded for purposes of identity information, the parity of each of the information sections as well as the over-all parity of each equivalent binary coded notation, therefore, properly contains an odd number of binary "1's."

The provision that the first and second information sections be mirrored images allows for the bidirectional processing of the first and second blocks of identity information on a single-error correcting basis. In the discussion now set forth, it is postulated that not more than a single error occurs with respect to a single equivalent binary coded notation during the transmission and/or recordation thereof. To secure the benefits of a single-error correcting, the parity of each of the information sections and, also, the over-all parity of the equivalent binary coded notation is examined. To facilitate an understanding of the single-error correcting techniques employable, a parity table is hereinafter set forth which illustrates the various parity comparisons which may be had.

| Parity Comparison | First Section | Second Section | Over-all |
|---|---|---|---|
| I | True | True | True. |
| II | True | True | False. |
| III | False | True | False. |
| IV | True | False | False. |

Where each of the parties are determined as proper, as in comparison I, the identity information can be derived from either of the information sections, e.g., the first information section, without recourse to the other information section. The result of comparision I is indicative of the proper recordation of the entire equivalent binary coded notation and is particularly denoted by a proper over-all parity. However, an error in recordation of one of the binary digits of an equivalent binary coded notation necessarily results in an improper over-all parity therefor as in comparisons II, III and IV. If such error is localized in one of the information sections, an improper parity is necessarily reflected to such information section. For example, as only a single error has been postulated, an improperly recorded binary digit necessarily appears in either of the information sections or the center bit slot T5 of the equivalent binary coded notation. In comparisons wherein the parity of each of the information sections has been determined as proper and the over-all parity is determined as improper, as in comparison II, the error is necessarily localized in the center bit slot T5 of the equivalent binary coded notation. Accordingly, identity information can, therefore, be derived from either of the information sections, e.g., the first information section of the equivalent binary coded notation. However, where the single error is localized in one of the two information sections of the equivalent binary coded notation, the parity of such information section as well as the over-all parity of the equivalent binary coded notation are improper, as in comparisons III and IV. In such case, the identity information can be derived from that information section having proper parity.

A redundancy of the identity information in the first and second information sections of the equivalent binary coded notations allows, firstly, for the determination of a single error in the transmission and/or recordation thereof, and, secondly, a reserve source of identity information to properly identify each particular bit of identity information. As the redundancy of identity information is presented to the automatic data processing equipments in a single information slot, such reserve source of identity information is immediately available thereto. It is evident that where an improper recordation of more than one of the binary digits of an equivalent binary coded notation occurs, the parity table set forth above is no longer applicable. However, statistical data may yet be accurately identified by a processing of the block of identity information oppositely recorded with respect to the statistical data.

*Detailed description*

Figure 1:
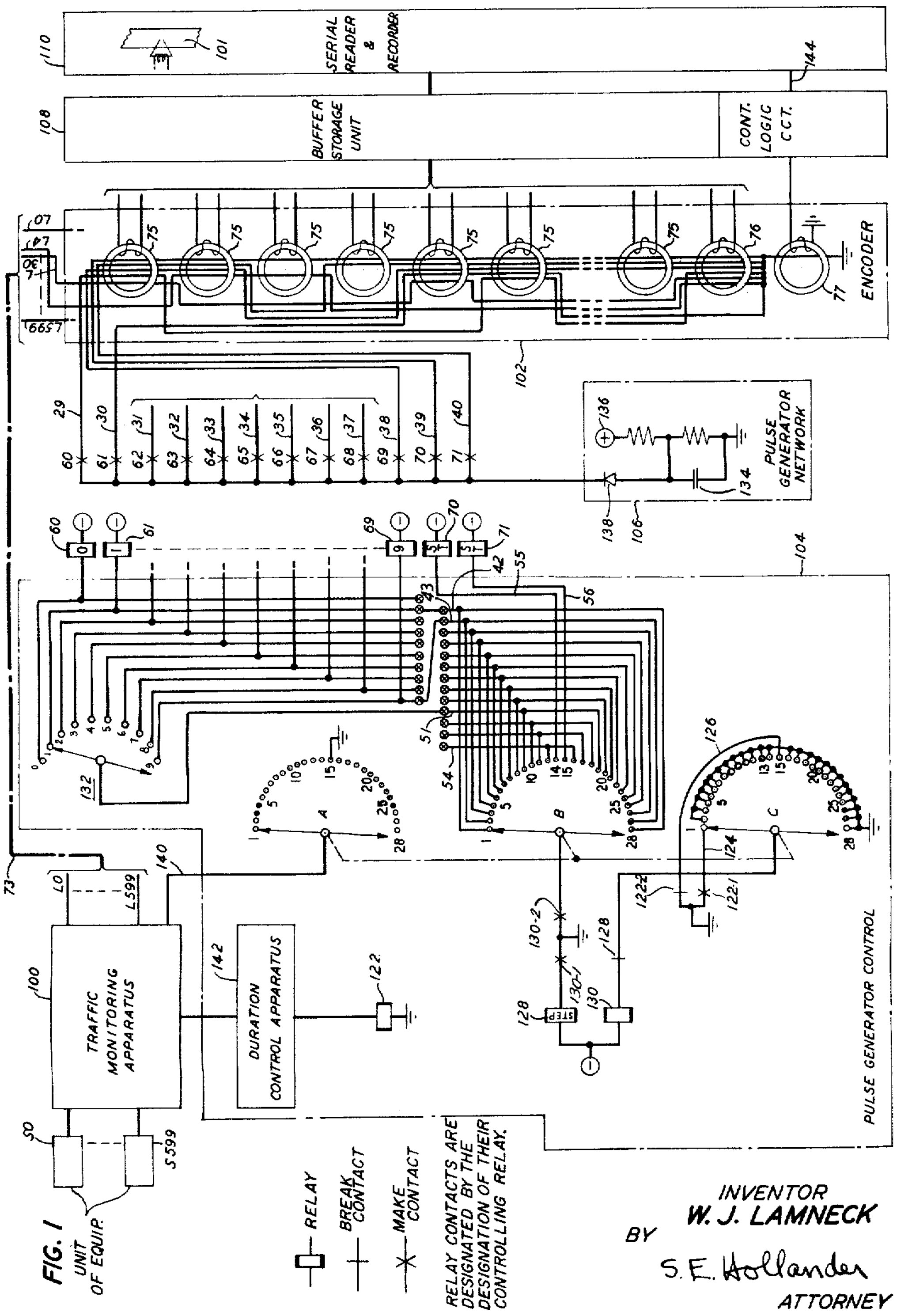

The data identity generator of this invention is incorporated into the traffic measuring apparatus disclosed in the above-identified D. H. Barnes patent application by providing that the encoder described therein operates to encode identity information directed thereto from the data identity generator as well as the statistical data directed thereto from the traffic monitoring apparatus 100. As illustrated, the encoder 102 is basically at translator device of the type disclosed in the H. D. Cahill Patent 2,599,358 issued on June 3, 1952 and, also the T. L. Dimond Patent 2,614,176 issued on October 14, 1952.

The encoder 102 comprises an arrangement of twelve transformer cores wherein each of the input leads 29 through 40 and, also, the input lead L0 through L599 is selectively threaded through or in by-pass thereof. With respect to the ten transformer cores 75 and the transformer core 76, each of the input leads L0 through L599 is selectively threaded in accordance with a reflected binary or Gray code equivalent, inclusive of parity bit, of a decimal number which has been arbitrarily assigned to each of the units of equipment S0 through S599, respectively, a threaded core representing a binary "1" and an unthreaded core representing a binary "0."

Each of the input leads 29 through 40, on the other hand, is selectively threaded through the ten transformer cores 75 and the transformer core 76 in accordance with a reflected binary or Gray code equivalent, inclusive of parity bit, of the decimal numbers designated as digits 0 through 9, forward start, and reverse start, respectively, as suggested in Table I of FIG. 2. Parity is provided to each of the equivalent binary coded notations by the selective threading of the transformer core 76. In addition, each of the input leads 29 through 40 and, also, the input leads L0 through L599 are threaded through the remaining transformer core 77 of the encoder 102 to provide control pulses to the control logic circuitry of the buffer storage unit 108 upon each equivalent binary coded notation having been directed from the encoder 102 and stored in the first storage stage therein.

As described in the above-identified D. H. Barnes patent application, each of the transformer cores 75 and 76 is provided with an output winding which is connected to the input winding of a corresponding magnetic core, not shown, in the first storage stage of the buffer storage unit 108; the output winding of the transformer core 77 is connected to the control logic circuitry of the buffer storage unit. Accordingly, during the current build-up of each pulse indication along a particular one of the input leads 29 through 40 and, also, the input leads L0 through L599, a voltage is developed across the output windings of each of the transformer cores 75, 76 and 77 through which the particular input lead is threaded. These voltages so developed across the output windings of the transformer cores 75 and 76 effect the storage of each equivalent binary code notation in parallel in the first storage stage of the buffer storage unit 108. The output winding of the transformer core 77 is wound oppositely with respect to those provided to the remaining transformer cores 75 and 76. Accordingly, as described in the above-identified D. H. Barnes patent application and, more particularly, in the G. W. Fredericks et al. patent application, Serial No. 1,603, filed on January 11, 1960 which is referred to therein, the voltage developed across the output winding of the transformer core 77 during the current decrease of each pulse indication along a particular one of the input leads 29 through 40 and, also, the input leads L0 through L599 of the encoder 102 is utilized to initiate an operation of the control logic circuitry of the buffer storage unit 108.

As fully described in the above-identified D. H. Barnes patent application, the buffer storage unit 108 comprises a plurality of tandemly arranged storage stages; each storage stage includes a plurality of storage elements corresponding one to each of the transformer cores 75 and 76 of the encoder 102 and control logic circuitry for providing an asynchronous operation thereto. In effect, the buffer storage unit 108 is a "walking storage" which automatically shifts each equivalent binary coded notation directed thereto from the encoder 102 along successive ones of the tandemly arranged storage stages to the last storage stage to be available in turn to the serial reader-recorder 110. Upon a binary coded notation having been stored in the last storage stage, the control logic circuitry of the buffer storage unit 108 is operative to direct an enabling pulse along the lead 144 to the serial reader-recorder 110. The equivalent binary coded notation stored in the last storage stage of the buffer storage unit 108 is, thereupon, serially read and recorded on a magnetic tape storage medium 101 therein contained as particularly described in the G. W. Fredericks et al. patent application, Serial No. 1,739, filed on January 11, 1960, now Patent No. 3,090,034, which is referred to in the above-identified D. H. Barnes patent application.

*Recording operation*

A recording of statistical data and the provision of identity information therefor is initiated by the duration control network 142 to energize a start relay 122. The relay 122 is provided a normally opened contact 122–1 and, also, a normally closed contact 122–2 to complete a current path to ground from the contacts 1 and 15, respectively, of arc C along the leads 124 and 126, respectively. Accordingly, the relay 122 completes an operate path for the relay 130 through the operated contact 122–1 at the contact 1 and the swinger arm of arc B and the normal contact 128 to initiate the stepping operation of the switch bank.

The normally unenergized step magnet 128 and relay 130 of the pulse generator control apparatus 104 provide for the self-stepping operation of the switch bank. In operating, relay 130 completes an operate path for the step magnet 128 through the operated contact 130–1. In addition, each operation of the relay 130 completes an operate path through another operated contact 130–2 thereof and the swinger arm of arc B and that one of the contacts 1 through 28 upon which it rests to energize that one of the control leads 42 through 56 connected thereto and, also, that one of the relays 60 through 71 which is connected, either by cross-connection or directly, to such control lead. The sequence of the operation of the step magnet 128 and relay 130 is such that upon each operation of the relay 130 through the normal contact 128, the step magnet 128 is energized through the operated contact 130–1 and, in turn, operates to interrupt the operate path of the relay 130 through the now operated contact 128 thereof. Upon the latter occurrence, the operate path of the step magnet 128 is interrupted through the again normal contact 130–1. However, upon releasing, the step magnet 128 again provides for the completion of an operate path for the rellay 130 through the normal contact 128 thereof and the wiper arm of arc C and the particular one of the contacts 1 through 28 which is provided a ground connection, hereinafter described. The step magnet 128 is adapted upon releasing to simultaneously advance the wiper arms of arcs A, B and C, respectively, to a next successive contact position.

As the control leads 42 through 54 are each multipled to the contacts 1 through 13, respectively, and 28 through 16, respectively, of arc B, they are energized in reversed sequences and, accordingly, in corresponding reflectedly disposed information slots, respectively, during a completed advancement of the wiper arm of arc B. Once the pattern of cross-connection to the control leads 42 through 54 is established, the energizations of the relays 60 through 69 are, also, selectively determined in corresponding reflectedly disposed information slots during a complete advancement of the wiper arm of arc B. It is evident that the relays 70 and 71, are similiarly operated upon an advance of the wiper arm of arc B to the contacts 14 and 15, respectively, to provide for the generation of start indications.

In instances where the identity information to be contained in a particular information slot is a time variable, the pattern of cross-connection of the relays 60 through 69 to that one of the control leads 42 through 54 corresponding to such slot can be effected on a time basis. The suggested identity designations set forth in Table II of FIG. 2 include various examples which are time variables. For example, the reflectedly disposed information slots corresponding to the contacts 10 and 19 of arc B and, also, the control lead 51 are each designated "hours units," i.e., the "units" digit of the particular hour during which the statistical data is accumulated. Accordingly, to provide for accurate identity information, it would be necessary to correct the pattern of cross-connection directed from the control lead 51 to the relays 60 through 69 on an hourly basis. To avoid such necessity, however, a time control switch 132 is employed to successively cross-connect the control lead 51 to the relays 60 through 69 on an hourly basis. The time control switch 132 is illustrated as comprising the contacts 0 through 9 and a wiper arm connected to the control lead 51. The wiper arm of the time control switch 132 is adapted to be advanced therealong on an hourly basis. The contacts 0 through 9 of the time control switch 132 are connected to the relays 60 through 69, respectively, thus providing automatically controlled selection of the "hours units" code digit. It is evident that similar time control switches may be employed to connect any of the other control leads 42 through 50 and 52 through 54 wherever the identity information to be provided in the information slots corresponding thereto is a time variable.

As hereinabove indicated, the sequence of operation of the relays 60 through 71 is determinative of the sequence in which pulse indications designating the decimal digits 0 through 9, a forward start indication, and a reverse start indication, respectively, are directed from the pulse generator network 106 along particular ones of the input leads 29 through 40, respectively, of the encoder 102. The pulse generator network 106 comprises a capacitor 134 which is adapted to be normally charged by the positive voltage source 136. Upon one of the relays 60 through 71 being energized, the resulting closure of the contact thereof completes a discharge path for the capacitor 134 through an isolation diode 138 and the operated contacts 60 through 71, respectively, to ground along one of the input leads 29 through 40, respectively, as threaded through the encoder 102. Pulse indications are, therefore, directed on a time or information slot basis along the particular ones of input leads 29 through 40 to be encoded and directed in parallel to the first storage stage of the buffer storage unit 108. The recovery time constant of the pulse generator network 106, however, should be such to allow for the charging of the capacitor during each successive stepping operation of the switch bank.

To provide for the generation of distinct blocks of identity information, the contacts 1 through 28 of the arc C of the switch bank are effectively divided into two contact sections, each contact section comprising fourteen contacts. The first contact in each contact section, i.e., contacts 1 and 15, respectively, are connectable by the leads 124 and 126, respectively, to ground through the normally opened contact 122–1 and the normally closed contact 122, respectively. The remaining contacts, i.e., contacts 2 through 14 and 16 through 28, of arc C are multipled to ground, as illustrated. Accordingly, upon the step magnet 128 having once operated and released to advance the wiper arm of arc C from contact 1, the switch bank is provided a self-stepping operation along the first contact section thereof as the relay 130 is provided a ground connection through the normal contact 128 upon each successive advance thereof along the contacts 2 through 14. While the relay 122 is maintained operated, the self-stepping operation of the switch bank is limited to the first contact section; the operate path for the relay 130 is interrupted at the first contact of the second contact section, i.e., contact 15 of arc C, along the lead 126 at the operated contact 122–2. The operate path of relay 130 is now through the normal contact 128, contact 15 and wiper arm of arc C to ground through the normally closed contact 122–2; at this time, however, the relay 122 is maintained operated by the duration control apparatus 142. The relay 130, therefore, remains unoperated and the self-stepping operation of the switch bank ceases; at this time, each of the control leads 42 through 55 have been successively energized and the first block of identity information followed by a forward start indication provided.

Referring now to arc A, the wiper arm thereof is connected along the lead 140 to the traffic monitoring apparatus 100. As the contact 15 of arc A is connected to ground, the appearance of a ground potential along the lead 140 provides an enabling potential to the traffic monitoring apparatus 100. Statistical data relevant to the units of equipment S0 through S599 is now directed on a time basis in the form of pulse indications along the input leads L0 through L599 and translated by the encoder 102 to equivalent binary coded notations for subsequent recording on the magnetic tape storage medium 101.

As described in the above-identified D. H. Barnes patent application, the traffic monitoring apparatus 100 is operative on either a fixed or random basis. Accordingly, the duration of operation thereof can be determined by either limiting the number of such operations or providing a time control therefor, respectively. The duration control apparatus 142 is, also, operative to effectively limit the number of cyclic operations or to control the time duration of operation of the traffic monitoring apparatus 100 as desired. The duration control apparatus 142 is illustrated in block form as it may comprise a conventional type counter arrangement provided with a recycling operation or a timing arrangement as is well known in the art. To effect such purpose, the duration control apparatus 142 is adapted to release the relay 122 and, at the same time, normalize.

The duration control apparatus 142 serves to reinitiate the operation of the data identity generator of this invention to provide the second block of identity information to be recorded and, accordingly, to inhibit the operation of the traffic monitoring apparatus 100. Prior to this time, the relay 122 has been operated to interrupt the operate path of the relay 130 through the normal contact 128 and the contact 15 of arc C at the operated contact 122. On the release of relay 122, therefore, an operate path is completed for the relay 130 through the now normal contact 122–2. The relay 130 in turn completes an operate path through the operated contact 130–2 thereof and the swinger arm and contact 15 of arc B to energize the control lead 56 and operate the relay 71. The capacitor 136 of the pulse generator network 106 is, thereupon, discharged through the operated contact 71 and along the input lead 40 of the encoder 102 and a reverse start indication is encoded and inserted in the first storage stage of the buffer storage unit 108. It is thus evident that the statistical data as recorded on the magnetic tape storage medium 101 is immediately bracketed by a forward and a reverse start indication.

In addition, the relay 130 completes an operate path for the step magnet 128 to reinitiate the above-described self-stepping operation of the switch bank. Accordingly, the wiper arms of arcs A, B and C are now advanced along successive ones of the contacts 16 through 28 included in the second contact section thereof and the control leads 54 through 42 are now energized in turn and, subsequently, renormalize. Therefore, the relays 60 through 69 are now energized according to the pattern of cross-connection thereof to the control leads 54 through 42 but in a reverse sequence with respect to the sequence effected during the previous self-stepping operation of the switch bank. Accordingly, the equivalent binary coded notations having inherent symmetry are directed in a reverse sequence to the first storage stage of the buffer storage unit 108 as the second block of identity information to be ultimately recorded as a mirrored image of the first block of identity information on the magnetic tape storage medium 101 of the serial reader-recorder 110. The resulting recordation pattern on the magnetic tape storage medium 101 is illustrated in FIG. 3.

*Typical illustration of recording procedure*

To illustrate the manner in which bits of identity information are provided, assume that the traffic monitoring apparatus 100 is designated for purposes of traffic studies by the decimal number 19. Referring to Table II of FIG. 2, the reflectedly disposed information slots corresponding to the control leads 42 and 43, respectively, have been designated as the "apparatus tens" and the "apparatus units," respectively. Accordingly, the relays 61 and 69, which correspond to the decimal digits 1 and 9, respectively, are cross-connected, as illustrated, to the control leads 42 and 43, respectively. Upon the advancement of the wiper arm of arc B to each of the contacts 1 and 28 and the energization of the relay 130, the control lead 42 and, also, the relay 61 are energized through the operated contact 130–2 and a pulse indication is directed from the pulse generator network 106 along the input lead particularly identified with the decimal digit 1. Accordingly, the equivalent binary coded notation of the decimal digit 1, illustrated in Table I of FIG. 2, is directed from the encoder 102 to the buffer storage unit 108 for recording on the magnetic tape storage medium 101 in reflectedly disposed information slots corresponding to contacts 1 and 28, respectively, of arc B and, also, the control lead 42.

Similarly, upon the advancement of the wiper arm of arc B to each of the contacts 2 and 27 and the energization of the relay 130, the control lead 43 and, also the relay 69 are next energized through the operated contact 130–2 and a pulse indication is directed from the pulse generator network 106 along the input lead 38 particularly identified with the decimal digit 9. The equivalent binary coded notation of the decimal digit 9, illustrated in Table I of FIG. 2, is now directed from the encoder 102 to the buffer storage unit 108 for recording on the magnetic tape storage medium 101 in reflectedly disposed information slots corresponding to the contacts 2 and 27, respectively, of arc B and, also, the control lead 43. These equivalent binary coded notations identify the traffic monitoring apparatus 100 on a digit basis upon a processing thereof by the automatic data processing equipment.

It is evident that a completion of a cross-connection pattern to the remaining ones of the control leads 44 through 54 provides for the selective energizations of the relays 60 through 69 upon a complete advance of the wiper arm of arc B whereby equivalent binary coded notations of selected ones of the decimal digits 0 through 9, respectively, are recorded on the magnetic tape storage medium in the remaining reflectedly disposed information slots corresponding to the contacts 3 through 26, respectively.

It is to be understood that the above-described arrangements are illustrative of the application of the principles of this invention. Numerous other arrangements may be devised by those skilled in the art without departing from the spirit and scope of the invention.

What is claimed is:

1. An apparatus for identifying data recorded on a storage medium comprising a reversibly operative generator means for providing bits of identity information with respect to said data, first means for operating said generator means to provide said bits of identity information in a first predetermined sequence, recorder means responsive to said generator means for recording said identity information provided therefrom, means operative upon a completed operation of said first means for accumulating and providing said data to said recorder means for recording said data on said storage medium, and second means operative upon a completed operation of said accumulating and operating means for operating said generator means to provide said bits of identity information in a second predetermined sequence, said first and said second predetermined sequences being reversed.

2. An apparatus as set forth in claim 1 wherein said generator means includes encoder means for providing said bits of identity information as coded notations having a pair of identity information sections, the sequence of said bits in one of said sections being the reverse of the sequence of said bits in the other of said sections.

3. An apparatus as set forth in claim 1 wherein said first and second means include a stepping arrangement of elements for controlling the operation of said generator means.

4. An apparatus as set forth in claim 1 further comprising means for controlling the duration of operation of said accumulating and providing means.

5. An apparatus for identifying data to be recorded on a storage medium comprising an encoder device, first means for serially directing digits of identity information in a predetermined sequence to said encoder device, said encoder device including means operative to translate each of said digits of identity information directed thereto into an equivalent notation having first and second multibit identity information sections, the bits in said first section being the reverse sequence of the bits in said second section, recording means connected to said encoder device, means for accumulating and providing said data to said recording means, and second means for serially directing identical digits of identity information in reverse of said predetermined sequence to said encoder device.

6. An apparatus for identifying data to be recorded on a storage medium by a pair of blocks of identity information comprising means for defining corresponding information time intervals in each of said pair of blocks to be reflectedly disposed, means for providing predetermined digits of identity information relevant to said data in corresponding ones of said information time intervals in said pair of blocks, said providing means further including means for generating coded notational equivalents having two identical but oppositely oriented sections individually representative of a respective one of said digits of identity information, means for serially recording said equivalent coded notations according to said defined information time intervals, means for recording statistical data intermediate said first and said second blocks of identity information as recorded on said storage medium, and additional means for recording a start indication immediately bracketing said data as recorded on said storage medium.

7. An apparatus for identifying data to be recorded on a storage medium comprising an encoder device having a plurality of input leads particularly designating a unit of identity information relevant to said data, first means for directing pulse indications along predetermined ones of said input leads in a predetermined sequence, said encoder device including means responsive to the appearance of a pulse indication along each of said input leads for providing a coded notation particularly designating each input lead, means for storing each of said coded notations in parallel, means for serially recording said each of said coded notations so stored, means operative upon said coded notations having been recorded for accumulating and recording said data, and second means operative upon said data having been accumulated to successively direct pulse indications along said predetermined ones of said input leads in a sequence in reverse with respect to that provided by said first means.

8. An apparatus for identifying data to be recorded on a final storage medium comprising an encoder device having a first plurality and a second plurality of input leads, each of said first plurality of input leads particularly designating a unit of identity information relevant to said data to be identified, each of said second plurality of input leads particularly designating a particular unit of data to be recorded, first means for successively energizing predetermined ones of said first plurality of input leads in a predetermined sequence, second means operative upon said predetermined ones of said first input leads having been energized to energize predetermined ones of said second input leads in accordance with said units of data to be recorded, means operative upon said data having been accumulated for reoperating said first means to reenergize said predetermined ones of said first input leads in a reverse sequence, said encoder device being responsive to the energization of each of said predetermined first and second input leads for providing a notational equivalent of said unit of identity information and of said unit of data, respectively, particularly designated thereby, and means for recording the output of said encoder device.

9. In an apparatus for identifying data to be recorded on a storage medium, an encoder device having a plurality of input leads, each of said input leads particularly designating a unit of identity information relevant to said data, means for directing pulse indications along particular ones of said input leads in a predetermined sequence for particularly identifying said data, said selectively directing means including time controlled means for directing particular ones of said pulse indications along predetermined ones of said input leads on a time basis, said encoder device including means for providing an equivalent binary coded notation for particularly designating the appearance of a pulse indication along each of said input leads, means including said encoder device for accumulating said data to be identified, means for operating said selectively directing means for directing pulse indications along said particular input leads in reverse of said predetermined sequence, and means connected to said encoder device for recording said identity information to bracket said data on said storage medium.

10. An apparatus for providing identity information with respect to data to be recorded on a storage medium comprising a generator means for providing a series of digits of identity information, first means and second means for controlling said generator means to provide said series of digits of identity information in a forward and a reverse sequence, respectively, means for translating said digits of identity information directed from said generator to equivalent notations, said translating means including means for translating predetermined ones of said digits of identity information on a time variable basis, means operative upon a completed operation of said first means for accumulating said data to be identified, said second means being operative upon a completed operation of said accumulating means, and serially recording means for bracketing said accumulated data by mirrored images of said notations translated during said first and said second operations of said generator.

11. An apparatus for identifying data to be recorded on a storage medium comprising generator means for providing a series of digits of identity information in equivalent notational forms, first means for controlling said generator means so as to provide said series of digits of identity information in a first predetermined sequence, means operative upon said first predetermined seqence having been provided for accumulating data to be particularly identified, duration control means for limiting the operation of said accumulating means, second means responsive to said duration control means for controlling said generator means to provide said series of digits of identity information in a second sequence reversed with respect to said first predetermined sequence, and means for serially recording said accumulated data and said series of digits of identity information so provided on a time basis.

12. An apparatus for identifying data to be recorded on a storage medium comprising generator means for providing predetermined digits of identity information with respect to said data to be identified, encoder means responsive to said generator means and including means for serially providing a first and a second multibit coded representation of each of said digits of identity information, said first and said second representations being mirrored images, recording means responsive to said encoder means, first means for controlling said generator means to provide said predetermined digits of identity information in a first directional sequence, means operative upon said predetermined digits of identity information having been provided in said first sequence for accumulating said data, second means operative upon said statistical data having been accumulated for controlling said generator means to again provide said predetermined digits of identity information but in a second directional sequence reverse with respect to said first sequence whereby the bits of each of said multibit coded representations of said identity information is represented as a serial recordation of mirrored images and, also, said first directional and said second directional sequences of digits of identity information recorded prior to and subsequent to said data are represented as mirrored images.

13. An apparatus for identifying statistical data to be recorded on a storage medium comprising means for defining a first series of information time intervals, means for generating a series of predetermined bits of identity information relevant to said statistical data to be included one in each of said first series of information time intervals, means for accumulating said statistical data to be identified, means operative upon said statistical data having been accumulated for reoperating said defining means to provide a second series of information time intervals, means for controlling said generator means to generate a reverse series of said predetermined bits of identity information to provide a same one of said predetermined bits of identity information in corresponding reflectedly disposed information time intervals in said first and second series, and means for serially recording said first series, said accumulated statistical data, and said second series on said storage medium on a time basis.

14. An apparatus as set forth in claim 13 wherein said serially recording means includes means for translating each of said predetermined bits of identity information to a coded representation having two identical but oppositely oriented identity information sections.

References Cited by the Examiner

UNITED STATES PATENTS

| | | | |
|---|---|---|---|
| 2,393,403 | 1/46 | Ostline | 179—8 |
| 2,513,112 | 6/50 | Shepherd | 179—7 |
| 2,599,358 | 6/52 | Cahill | 179—8.5 |
| 2,688,658 | 9/54 | Carpenter et al. | 179—7.1 |
| 2,946,044 | 7/60 | Bolgiano | 340—172.5 |
| 3,016,522 | 1/62 | Laurie et al. | 340—172.5 X |

MALCOM A. MORRISON, *Primary Examiner.*

EVERETT R. REYNOLDS, *Examiner.*